United States Patent
Tiwari et al.

(10) Patent No.: US 11,550,506 B2
(45) Date of Patent: Jan. 10, 2023

(54) SYSTEMS AND METHODS FOR ACCESSING HYBRID STORAGE DEVICES

(71) Applicant: EMC IP Holding Company LLC, Hopkinton, MA (US)

(72) Inventors: Rajeev Tiwari, San Jose, CA (US); Yong Zou, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 12 days.

(21) Appl. No.: 17/037,517

(22) Filed: Sep. 29, 2020

(65) Prior Publication Data

US 2022/0100422 A1    Mar. 31, 2022

(51) Int. Cl.
*G06F 3/06* (2006.01)

(52) U.S. Cl.
CPC ............ *G06F 3/0659* (2013.01); *G06F 3/061* (2013.01); *G06F 3/068* (2013.01)

(58) Field of Classification Search
CPC ...... G06F 3/061; G06F 3/0619; G06F 3/0653; G06F 3/0656; G06F 3/0659; G06F 3/068
See application file for complete search history.

(56) References Cited

U.S. PATENT DOCUMENTS

| | | |
|---|---|---|
| 7,818,500 B2 | 10/2010 | Nagaram |
| 9,069,553 B2 | 6/2015 | Zaarur et al. |
| 9,411,646 B2 | 8/2016 | Lei |
| 10,846,219 B2 | 11/2020 | Fevrier et al. |
| 11,086,525 B2 | 8/2021 | Stabrawa et al. |
| 11,093,156 B1 | 8/2021 | Lin et al. |
| 11,231,862 B1 | 1/2022 | Vig et al. |
| 2004/0088477 A1 | 5/2004 | Bullen et al. |
| 2007/0220227 A1 | 9/2007 | Long |
| 2009/0292887 A1 | 11/2009 | Manczak et al. |
| 2010/0250849 A1 | 9/2010 | Eilert |
| 2012/0093204 A1 | 4/2012 | Al-dhahir et al. |
| 2012/0306529 A1* | 12/2012 | Omori ................ H01L 25/0652 324/763.01 |
| 2015/0121137 A1 | 4/2015 | Mcknight et al. |
| 2015/0186068 A1* | 7/2015 | Benisty .................. G06F 3/061 711/154 |
| 2015/0278048 A1 | 10/2015 | Seibert et al. |
| 2016/0179393 A1 | 6/2016 | Masuda et al. |
| 2018/0217951 A1* | 8/2018 | Benisty .............. G06F 13/1642 |

(Continued)

OTHER PUBLICATIONS

"MIPS Processors Overview"; Imagination Technologies Limited; Feb. 2014 (http://mcst.ru/files/54326f/960cd8/50de62/000000/mips_overview-brochure-mwc-ew-ee_feb14_web.pdf).

(Continued)

*Primary Examiner* — Larry T Mackall
(74) *Attorney, Agent, or Firm* — Chamberlain, Hrdlicka, White, Williams & Aughtry

(57) ABSTRACT

A method for processing requests, that includes receiving, by a volatile storage component, a request from a user space application, writing the request into a shared memory partition, generating instructions associated with the request, and processing the instructions, where the request is a data request and where generating the instructions associated with the request includes detecting, by the volatile storage component, the data request in the shared memory partition, where the data request is written in a data queue.

14 Claims, 12 Drawing Sheets

(56) References Cited

U.S. PATENT DOCUMENTS

2019/0012101 A1 1/2019 Jenne
2019/0220365 A1 7/2019 Mallela et al.
2019/0278514 A1* 9/2019 Chaturvedi ............ G11C 29/36
2019/0310859 A1 10/2019 Kopfstedt et al.

OTHER PUBLICATIONS

"OCTEON II CN60XX Multi-Core MIPS64 Processors"; Cavium; 2011.
Jeff Chang and Arthur Sainio; "NVDIMM-N Cookbook: A Soup-to-Nuts Primer on Using NVDIMM-Ns to Improve Your Storage Performance"; Storage Networking Industry Association (SNIA), Global Education; 2015.
Seagate Product Marketing; "Get S.M.A.R.T. for Reliability"; Seagate Technology, Inc.; Technology Paper, No. TP-67D; Jul. 1999.
Dremail Abdul, How Firmware Works, The Andplus Blog, Oct. 9, 2019.
Jeff Chang & Arthur Sainio, SNIA Global Education, NVDIMM-N Cookbook: A Soup-to-Nuts Primer on Using NVDIMM-Ns to Improve Your Storage Performance, 2015, pp. 1-41.

* cited by examiner

SYSTEMS AND METHODS FOR ACCESSING HYBRID STORAGE DEVICES

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a method for processing requests, that includes receiving, by a volatile storage component, a request from a user space application, writing the request into a shared memory partition, generating instructions associated with the request, and processing the instructions.

In general, in one aspect, embodiments relate to a non-transitory computer readable medium that includes computer code which, when executed by a computer processor, enables the computer processor to perform a method for processing requests, that includes receiving, by a volatile storage component, a request from a user space application, writing the request into a shared memory partition, generating instructions associated with the request, and processing the instructions.

In general, in one aspect, embodiments relate to a volatile storage component, that includes volatile storage device, shared memory partition, and a processor, where the processor is configured to perform a method for processing requests, that includes receiving a request from a user space application, writing the request into the shared memory partition, generating instructions associated with the request, and processing the instructions.

Other aspects of the invention will be apparent from the following description and the appended claims.

DETAILED DESCRIPTION

Figure 1:
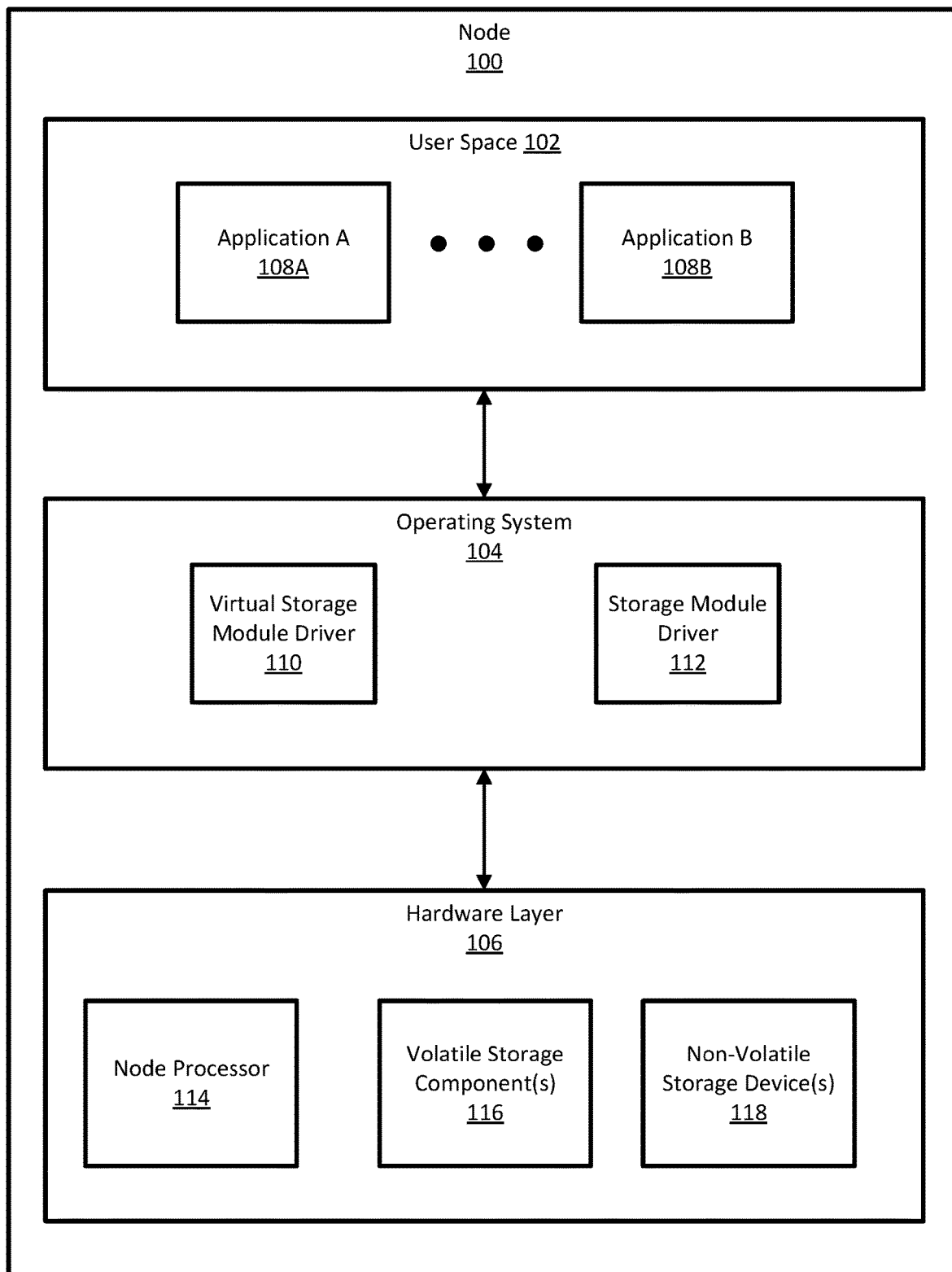
FIG. 1 shows a diagram of node, in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

In general, embodiments of the invention relate to systems and methods for interacting with and managing individual components of a hybrid volatile and non-volatile storage device. Hybrid volatile and non-volatile storage devices use a volatile storage device as the primary location to store and manipulate data. However, as data stored in a volatile memory device may be erased upon loss of power, the hybrid devices include a battery to power the hybrid device for a period of time after power failure to enable copying the data from the volatile storage device to the non-volatile storage device. Further, to perform these operations, a processor and some firmware must be installed on the hybrid device to detect power failure, initiate copying of the volatile data ("vaulting"), perform a safe shut down when vaulting is complete, and properly recover the data when power is restored.

However, certain hybrid devices are designed and built to be presented as a single volatile storage device. That is, when installed in a system, a hybrid storage device may be treated (by the system) as a single volatile memory device without additional components (a processor executing firmware, a non-volatile storage device, a battery, etc.). Accordingly, although multiple components are included within the hybrid device, no additional information and operations may be performed on those components individually.

To provide further control and transparency to such hybrid devices, one or more embodiments disclosed herein provide for systems and methods to interact with individual components of such hybrid devices. For example, custom firmware may be installed in the hybrid device to receive commands from one or more system components and allow for the transmission of data between individual components of the hybrid device and applications executing in user space of the system. Further, direct manipulation of data may be performed within the volatile and non-volatile storage device of the volatile storage component.

FIG. 1 shows a diagram of node, in accordance with one or more embodiments of the invention. In one or more embodiments of the invention, a node (100) is a computing device (not shown). In one or more embodiments of the invention, a computing device includes one or more processor(s) (e.g., node processor (114)), memory (e.g., volatile storage component(s) (116)), and persistent storage (e.g., non-volatile storage device(s) (118)). The persistent storage (and/or memory) may store computer instructions (e.g., computer code) which, when executed by the processor(s) of the computing device, cause the computing device to issue one or more requests and to receive one or more responses. Non-limiting examples of a computing device include a mobile phone, tablet computer, laptop computer, desktop computer, server, distributed computing system, or cloud resource. The node (100) may include a user space (e.g., user space (102)), an operating system (e.g., operating system (104)), and/or a hardware layer (e.g., hardware layer (106)). Each of these components is described below.

In one or more embodiments of the invention, a user space (e.g., user space (102)) is a software environment executing on the node (100) that generally provides a virtual space in which user-initiated software executes (e.g., programs, application(s) (108A, 108B), etc.). In one or more embodiments of the invention, user space (102) is provided a segregated memory environment (from memory utilized by operating system (104)) and may be able to leverage more of the underlying resources of the node (100) to execute user space software (108A, 108B). In one embodiment of the invention, user space (102) does not have direct access to underlying hardware components (i.e., those of hardware layer (106)). Instead, user space software must provide commands and/or requests to the operating system (104), which coordinates the exchange of information between user space software and hardware layer (106) components. A user space (102) may include one or more applications (e.g., application A (108A), application B (108B), etc.), described below.

In one or more embodiments of the invention, an application (e.g., application A (108A), application B (108B), etc.) is software executing within the user space (102), that may include instructions which, when executed by a node processor (114), initiate the performance of one or more operations of components of the hardware layer (106). Although application(s) (108A, 108B) are shown executing directly in user space (102), one or more applications (e.g., 108A, 108B) may execute inside of an application container (not shown). That is, one or more application(s) (e.g., 108A, 108B) within an application container that is executing directly within user space (102).

In one or more embodiments of the invention, an operating system (e.g., operating system (104)) is software executing on the node (100). In one embodiment of the invention, an operating system (104) coordinates operations between software executing in user space (102) and one or more components of the hardware layer (106) to facilitate the proper use of the components of the hardware layer (106). In one or more embodiments of the invention, the operating system (104) includes a software (e.g., 110, 112). In one embodiment of the invention, the operating system (104) may be executing software that monitors data traversing the operating system (104) (e.g., interactions between user space (102) software and hardware layer (106) components) and may intercept, modify, and/or otherwise alter that data based on one or more conditions specified by the software executing in user space (108A, 108B). Specifically, an operating system may include a virtual storage module driver (e.g., virtual storage module driver (110)) and/or a storage module driver (e.g., storage module driver (112)). Each of these components is described below.

In one or more embodiments of the invention, a storage module driver (e.g., storage module driver (112)) is software executing in the operating system (104) that coordinates interactions between user space software (e.g., 108A, 108B) with storage devices (e.g., volatile storage component(s) (116), non-volatile storage device(s) (118)). In one or more embodiments of the invention, the storage module driver (112) may be software that is installed in operating system (104) as part of the operating system itself (i.e., a standard program that is packaged/included with the operating system). However, in one embodiment of the invention, the storage module driver (112) may be modified to interact between the virtual storage module driver (110) and one or more storage device(s) (e.g., 116, 118).

In one or more embodiments of the invention, a virtual storage module driver (e.g., virtual storage module driver (110)) is software executing in the operating system (104) that coordinates interactions between user space software (e.g., 108A, 108B) and the storage module driver (112). Specifically, the virtual storage module driver (110) may create one or more virtual user space partitions (discussed in the description of FIG. 3). Further, the virtual storage module driver (110) may monitor data requests (e.g., read/write requests) and management requests issued to and from one or more user space application(s) (108A, 108B) as they traverse the operating system (104). Additionally, in one or more embodiments of the invention, when data requests meet certain criteria, the virtual storage module driver may intercept, modify, and/or otherwise alter that data request based on one or more conditions. In one embodiment of the invention, the virtual storage module driver (110) is capable of redirecting requests received by the operating system (104) by intercepting and modifying that request to specify a recipient different than originally specified. In one or more embodiments of the invention, the virtual storage module driver (110) may be custom software that is not initially included and/or installed with the operating system (104).

In one or more embodiments of the invention, a hardware layer (e.g., hardware layer (106)) is a collection of physical components configured to perform the operations of the node (100) and/or otherwise execute the software of the node (100) (e.g., application A (108A), application B (108B), virtual storage module driver (110), storage module driver (112), etc.). A hardware layer (106) may include a node processor (e.g., node processor (114)), one or more volatile storage component(s) (e.g., volatile storage component(s) (116)), and/or one or more non-volatile storage device(s) (e.g., non-volatile storage device(s) (118)). Each of these components is described below.

In one or more embodiments of the invention, a node processor (e.g., node processor (114)) is an integrated circuit for processing instructions (e.g., those of node (100) software (e.g., (108A, 108B, 110, 112)). In one embodiment, a node processor (114) may be one or more processor cores or processor micro-cores.

In one or more embodiments of the invention, a volatile storage component (e.g., volatile storage component(s) (116)) is one or more hardware devices capable of storing digital information (e.g., data) in a temporary storage medium (i.e., when power is maintained) and includes further components to facilitate the storage of data in the volatile storage component(s) (116). Additional details regarding volatile storage component(s) (116) may be found in the discussion of FIG. 2.

In one or more embodiments of the invention, a non-volatile storage device (e.g., non-volatile storage device(s) (118)) is one or more hardware devices capable of storing digital information (e.g., data) in a non-transitory medium. In one or more embodiments of the invention, a non-volatile storage device (118) is capable of persisting data in a non-volatile medium such that, if electrical power is not supplied to the hardware, the data stored on the non-volatile storage device (118) is retained. A non-volatile storage device (118) may be any form of storage that is capable of storing data in a non-volatile medium (regardless of whether that data is written and/or read at a "byte-level" or "block-level"). Non-limiting examples of a non-volatile storage device (118) include integrated circuit ("solid state") storage devices (e.g., solid-state drive (SSD), Non-Volatile Memory Express (NVMe), flash memory device, resistive RAM (ReRAM)), magnetic storage devices (e.g., hard disk drive (HDD), floppy disk, tape, diskette, etc.), and/or optical media (e.g., compact disc (CD), digital versatile disc (DVD), etc.).

While FIG. 1 shows a specific configuration of a system, other configurations may be used without departing from the scope of the invention. For example, shows on a single volatile storage component (116) and a single non-volatile storage device (118), any number of these devices may exist within the node (100). Accordingly, embodiments disclosed herein should not be limited to the configuration of devices and/or components shown in FIG. 1.

Figure 2:
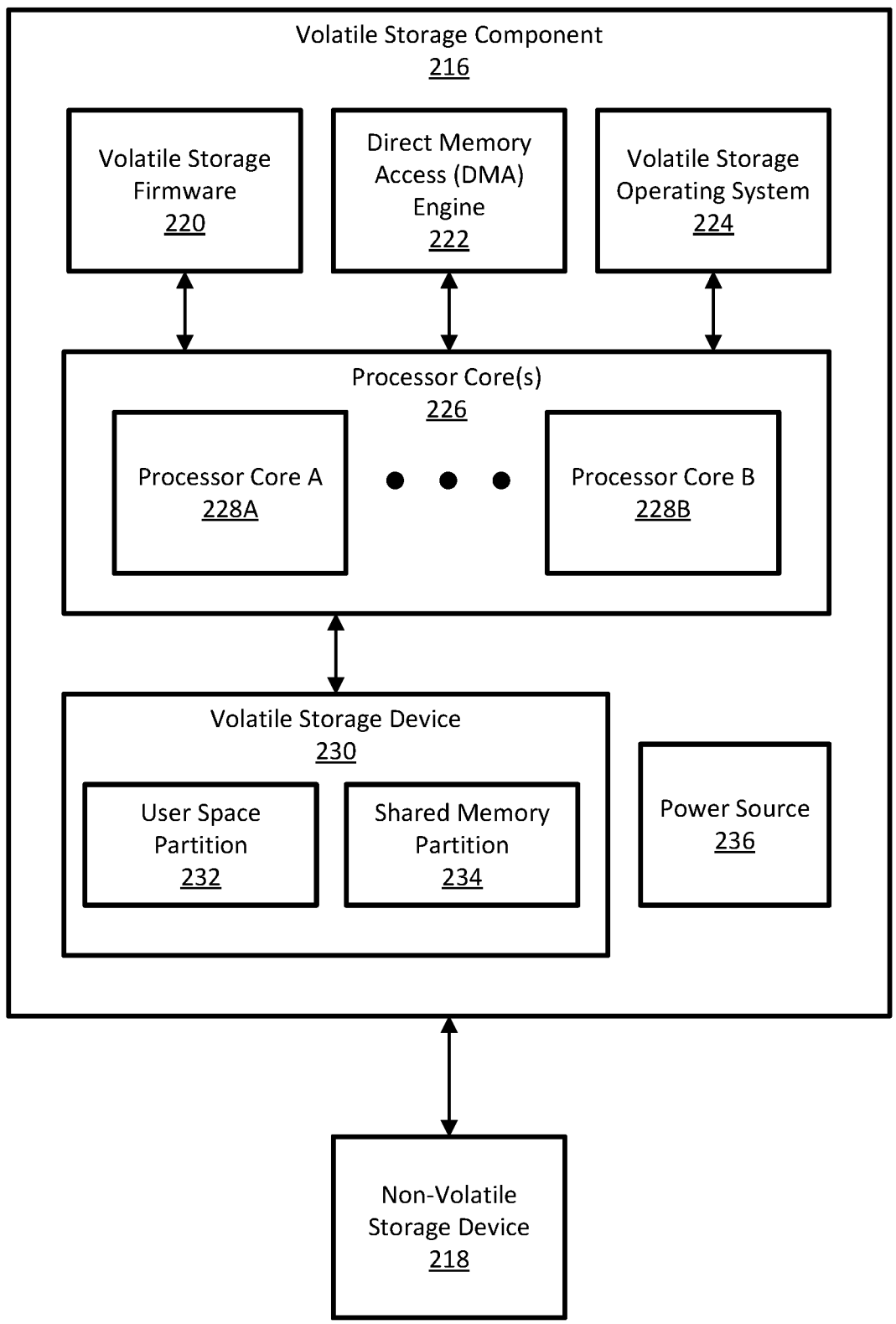
FIG. 2 shows a diagram of a volatile storage component, in accordance with one or more embodiments of the invention.

FIG. 2 shows a diagram of a volatile storage component, in accordance with one or more embodiments of the invention. In one or more embodiments of the invention, a volatile storage component (e.g., volatile storage component (216)) is hybrid devices that includes a volatile storage device (230) and one or more components configured to copy volatile data to a non-volatile storage device (218) upon detection of power loss. The volatile storage component (216) may include volatile storage firmware (e.g., volatile storage firmware (220)), a direct memory access (DMA) engine (e.g., DMA engine (222)), a volatile storage operating system (e.g., volatile storage operating system (224)), one or more processor core(s) (e.g., processor core(s) (226)), a volatile storage device (e.g., volatile storage device (230)), and/or a power source (e.g., power source (236)). Each of these components is described below.

In one or more embodiments of the invention, volatile storage firmware (e.g., volatile storage firmware (220)) is software executing in the volatile storage component (216) that that facilities communications and transmission of data relating to the processing of requests of the volatile storage component (216) generally. In one or more embodiments of the invention, the volatile storage firmware (220) is the main method of interaction between the node and the volatile storage component (216) (except for data that is "directly" read and written using the direct memory access).

In one or more embodiments of the invention, a direct memory access (DMA) engine (e.g., DMA engine (222)) is software executing in the volatile storage component (216) that facilities communications and transmission of data relating to the processing of data requests of the volatile storage device (230). The DMA engine (222) may be capable of receiving a write data request from the storage module driver and directly writing that data to a location on the volatile storage device (230) specified by the write data request. Similarly, the DMA engine (222) may be capable of receiving a read data request from the storage module driver and directly reading data from the location on the volatile storage device (230) specified by the read data request.

In one or more embodiments of the invention, a volatile storage operating system (e.g., volatile storage operating system (224)) is software executing in the volatile storage component (216). In one or more embodiments of the invention, the volatile storage operating system (224) is an entirely independent operating system from that of the node's operating system. The volatile storage component (216) may be viewed as an independent system, including all of the components of a computing device interpedently. Accordingly, the volatile storage operating system (224) is the operating system that executes on the volatile storage component (216) to manage interactions between other software instances (220, 224) and the hardware components (230, 236, 218) of the volatile storage component (216).

In one or more embodiments of the invention, a processor core (e.g., processor core(s) (226), processor core A (228A), processor core B (228B)) is one or more integrated circuit(s) for processing instructions (e.g., those of volatile storage component (216) software (e.g., (220, 222, 224)). In one embodiment, a processor core(s) (226) may be one or more processor cores or processor micro-cores. In one or more embodiments of the invention, each of the volatile storage firmware (220), DMA engine (222), and volatile storage operating system (224) are executing independently on separate processor cores (228A, 228B, etc.). Accordingly, each software instance may concurrently perform operations using the processing resources of their individual processor core (228A, 228B, etc.) on which they are executing.

In one or more embodiments of the invention, a volatile storage device (e.g., volatile storage device (230)) is one or more hardware devices capable of storing digital information (e.g., data) in a non-transitory medium. Additional detail regarding the user space partition (232) and shared memory partition (234) may be found in the description of FIGS. 3-4. In one or more embodiments of the invention, the volatile storage device (230) is comprised of one or more partitions (e.g., user space partition (232) and shared memory partition (234)). Further, in one or more embodiments of the invention, volatile storage device (230) is 'volatile' such that when electrical power to the volatile storage device (230) ceases, the data stored thereon is irretrievably erased. In one or more embodiments, volatile storage device (230) may be a form of 'memory' such that when accessing a volatile storage device (230), software may be capable of reading and writing data at the smallest units of data normally accessible (e.g., "bytes"). Specifically, in one or more embodiments, a volatile storage device (230) may include a unique physical address for each byte stored thereon, thereby enabling software to access and manipulate data stored in the volatile storage device (230) by directing commands to a physical address of the volatile storage device (230) that is associated with a byte of data (e.g., via a virtual-to-physical address mapping). Accordingly, in one or more embodiments, software is able to perform direct, "byte-level" manipulation of data stored in the volatile storage device (230) (unlike, for example, data located stored on traditional persistent storage devices, which must first be copied in "blocks" to other, intermediary storage mediums prior to reading and/or manipulating data located thereon). Non-limiting examples of volatile storage device (230) include, but are not limited to, certain integrated circuit storage (e.g., random access memory (RAM), dynamic RAM (DRAM), static RAM (SRAM), etc.).

In one or more embodiments of the invention, a power source (e.g., power source (236)) is hardware capable of storing electrical energy in chemical energy (e.g., an alkaline power source, a lithium-ion power source) and/or in an electrical field (e.g., a capacitor). In one or more embodiments of the invention, the power source (236) is electrically conductively coupled to one or more components of the volatile storage component (216) (and/or the node, generally) to provide electrical power in the event that an external power source is interrupted. As a non-limiting example, the power source (236) is configured to automatically provide power to processor core(s) (226), the volatile storage device (230), the non-volatile storage device (218), the non-volatile storage device (218), and/or any other device of FIGS. 1-2. In one or more embodiments of the invention, the power source (236) is capable of providing a voltage greater than or equal to the voltage provided by the node.

While FIG. 2 shows a specific configuration of a system, other configurations may be used without departing from the scope of the invention. For example, although non-volatile storage device (218) is shown as a separate component from the volatile storage component (216), the non-volatile storage device (218) may be part of the volatile storage component (216). Accordingly, embodiments disclosed herein should not be limited to the configuration of devices and/or components shown in FIG. 2.

Figure 3:
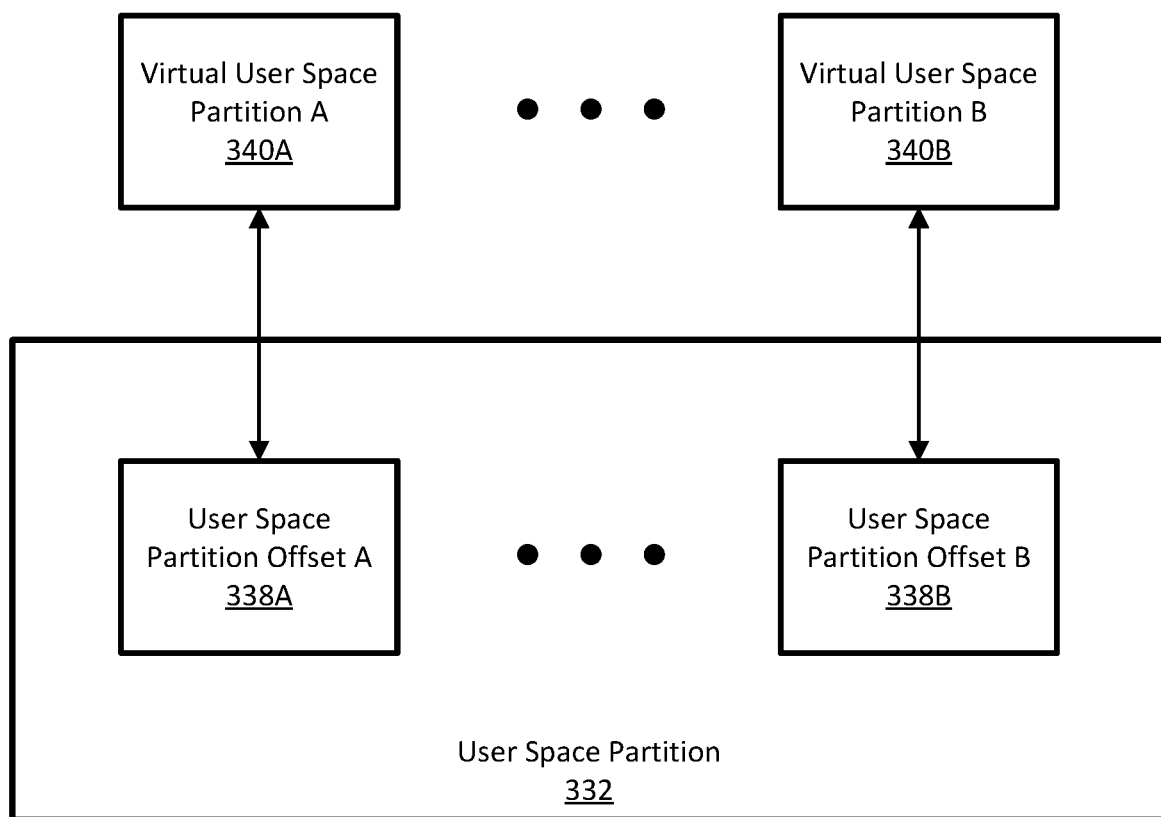
FIG. 3 shows a diagram of a user space physical partition, in accordance with one or more embodiments of the invention.

FIG. 3 shows a diagram of a user space physical partition, in accordance with one or more embodiments of the invention. In one or more embodiments of the invention, a user space partition (e.g., user space partition (332)) is region of the volatile storage device that is presented to the user space application as a storage location. The user space partition (332) may include one or more user space partition offset(s) (e.g., user space partition offset A (338A), user space partition offset B (338B), etc.) which are associated with one or more virtual user space partition(s) (e.g., virtual user space partition A (340A), virtual user space partition B (340B), etc.). Each of these components is described below.

In one or more embodiments of the invention, a user space partition offset (e.g., user space partition offset A (338A), user space partition offset B (338B)) is a physical address (e.g., a byte address) within the user space partition (332) of the volatile storage component. A user space partition offset (338A, 338B) may correspond to a location that is determined by the virtual storage module driver and falls exclusively within the user space partition (332) of the volatile storage device. In one or more embodiments of the invention, a user space partition offset (338A, 338B) may be used to indicate the begging of a virtual user space partition (340A, 340B) or mark the end location of a previous virtual user space partition (340A, 340B).

In one or more embodiments of the invention, a virtual user space partition (e.g., virtual user space partition A (340A), user space virtual partition B (340B)) is partition in the volatile storage device of the volatile storage component that subdivides the user space partition created by the storage module driver. Each virtual user space partition (340A, 340B) is associated with a user space partition offset (338A, 338B) that indicates a starting location of the virtual user space partition (340A, 340B). Further, a virtual user space partition (340A, 340B) may also be associated with a length (not shown) (e.g., a byte length, byte size) that specifies the size of the virtual user space partition (340A, 340B).

While FIG. 3 shows a specific configuration of a system, other configurations may be used without departing from the scope of the invention. Accordingly, embodiments disclosed herein should not be limited to the configuration of devices and/or components shown in FIG. 3.

Figure 4:
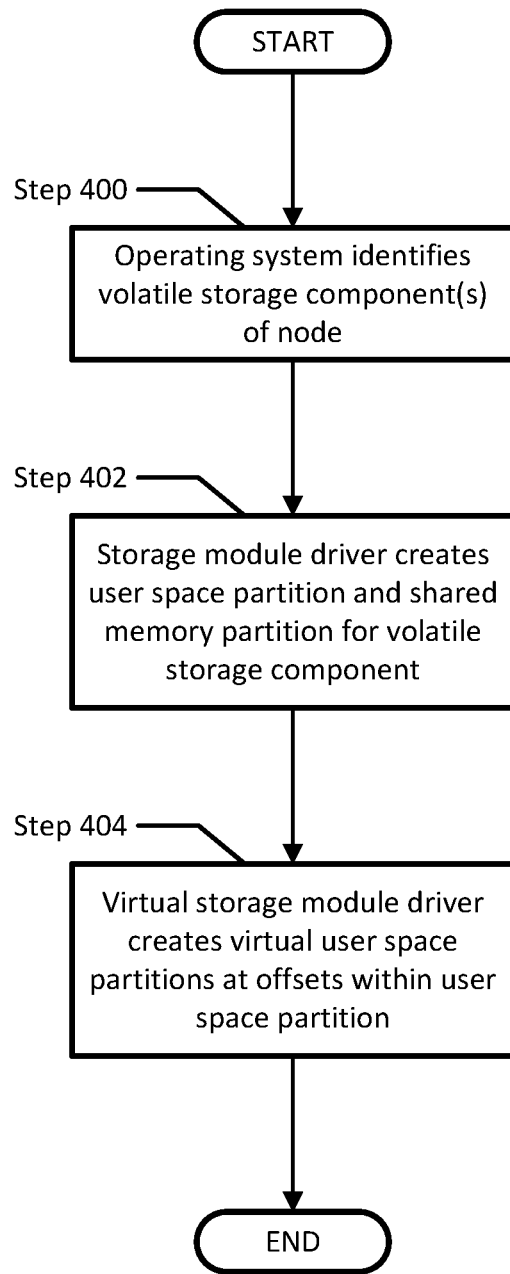
FIG. 4 shows a flowchart of a method of creating partitions for a volatile storage component, in accordance with one or more embodiments of the invention.

FIG. 4 shows a flowchart of a method of creating partitions for a volatile storage component, in accordance with one or more embodiments of the invention. All or a portion of the method shown in FIG. 4 may be performed by one or more components of the operating system. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, the operating system of the node identifies the volatile storage components included in the node. In one or more embodiments of the invention, upon initialization of a node, the operating system may perform one or more process(es) to identify the hardware that is operatively connected to the node. Accordingly, after installation of the volatile storage component, the operating system may initiate a process that determines if new and/or existing hardware devices are electrically coupled to communication interfaces of the node. Further, the operating system may identify the type of device (e.g., volatile storage device, non-volatile storage device, communication interface, etc.).

In Step 402, the storage module driver (of the node's operating system) creates a user space partition and a shared memory partition for the volatile storage component. The storage module driver creates these partitions by determining a physical offset (e.g., a byte address) and a length (of bytes) within the volatile storage component for each partition. In one or more embodiments of the invention, the storage module driver may consider the volatile storage component as a volatile storage device that includes no additional components of the volatile storage component (other than the volatile storage device). Accordingly, the storage module driver may handle the volatile storage component as a volatile storage device (and present the volatile storage component as a volatile storage device to user space software) without additional components and capabilities. Further, the storage module driver may have a limit on the total number of partitions that may be allocated to a volatile storage device (and/or volatile storage component) be limited. That is, the storage module driver may be configured to create only two partitions (e.g., the user space partition and the shared memory partition) or some other number of partitions (e.g., four partitions with two additional partitions reserved for system use).

In Step 404, the virtual storage module driver (of the node's operating system) creates two or more virtual user space partitions associated with two or more user space partition offsets, respectively. In one or more embodiments of the invention, as discussed in Step 402, the storage module driver may be limited in the total number of partitions that may be created for a volatile storage component. Accordingly, the virtual storage module driver may create two or more virtual user space partitions at different offsets within the single user space partition created by the storage module driver.

Figure 5:
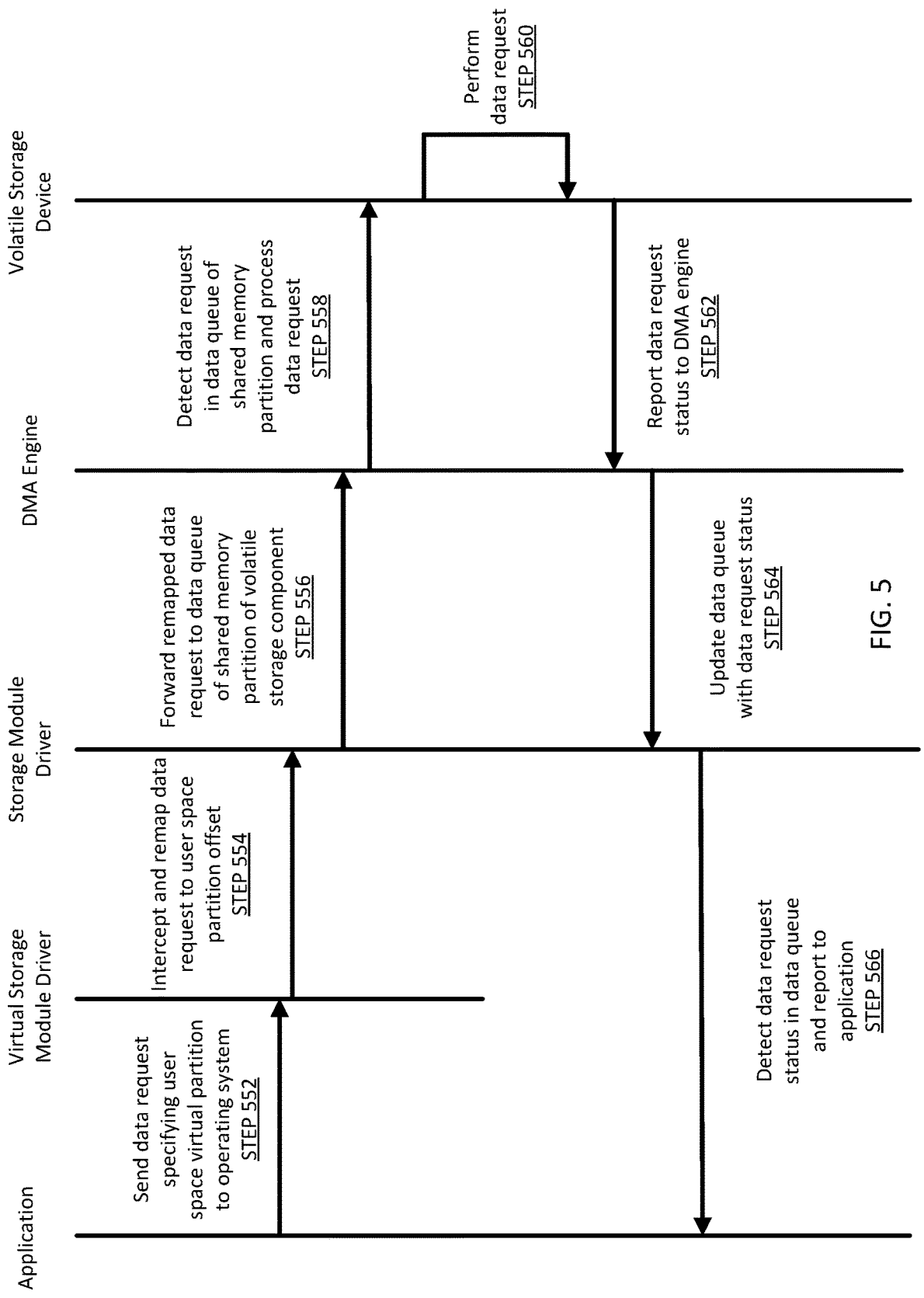
FIG. 5 shows a flowchart of a method of handling a data request, in accordance with one or more embodiments of the invention.

FIG. 5 shows a flowchart of a method of handling a data request, in accordance with one or more embodiments of the invention. All or a portion of the method shown in FIG. 5 may be performed by one or more components of the node. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 552, a user space application sends a data request to the operating system. The data request may specify a virtual user space partition (as created by the virtual storage module driver) and a file (e.g., by file handle or file identifier) within that virtual user space partition. In one or more embodiments of the invention, the data request may be a read request or a write request; and if the data request is a write request, the application may additionally specify the new data to be written, or the modification to be made to existing data.

In Step 554, the virtual storage module driver intercepts the data request sent by the application and remaps (i.e., modifies) the data request before forwarding the data request to the storage module driver. In one or more embodiments of the invention, the virtual storage module driver may monitor and analyze all requests to and from an application as those requests traverse the operating system. Further, if a data request is sent to the operating system by an application, the virtual storage module driver may intercept and analyze the data request to determine if the data request specifies a virtual user space partition (instead of the user space partition, generally, as created by the storage module driver). If the data request specifies a virtual user space partition, the virtual storage module driver remaps the data request using the user space partition offset associated with that virtual user space partition. In one or more embodiments of the invention, the virtual storage module driver modifies the data request such that the data request references (1) the user space partition and (2) the user space partition offset, and removes any reference to the virtual user space partition. After the data request is remapped, the virtual storage module driver forwards the remapped data request to the storage module driver.

In Step 556, the storage module driver receives the remapped data request from the virtual storage module driver. In one or more embodiments of the invention, the storage module driver analyzes the remapped data request to ensure that the data request specifies a partition of a storage device (e.g., the user space partition of the volatile storage component) of which the storage module driver is aware and able to process. After analyzing the remapped data request and determining that the remapped data request properly specifies the user space partition and a user space partition offset, the storage module driver forwards the remapped data request to the volatile storage component. Specifically, in one or more embodiments of the invention, the storage module driver may be configured to forward the remapped data request to a data queue located in the shared memory partition of the volatile storage component.

In Step 558, the DMA engine of the volatile storage component detects that data (i.e., the remapped data request) has been written to the data queue of the shared memory partition of the volatile storage component. In one or more embodiments of the invention, upon detection of the remapped data request in the data queue, the DMA engine processes the remapped data request by generating and sending one or more instructions within the volatile storage component to complete the action(s) specified in the remapped data request. For example, if the remapped data request is a read request, the DMA engine generates instructions to copy the specified data from the user space partition of the volatile storage device to the node processor. Similarly, if the remapped data request is a write request, the DMA engine generates instructions to copy the new/modified data to the location on the volatile storage device specified in the remapped data request (e.g., in the user space partition at the user space partition offset associated with the virtual user space partition). In one or more embodiments of the invention, after one or more instructions are generated to perform the actions of the remapped data request, the DMA engine executes these instructions using the volatile storage device of the volatile storage component.

In Step 560, the volatile storage device performs the actions specified in the instructions generated by the DMA engine (generated from the remapped data request). In one or more embodiments, the actions may include receiving data to be written to a specified address (e.g., from a write request) or the actions may include copying data from a specified address (e.g., a read request).

In Step 562, the volatile storage device reports the status of the actions (i.e., writes data) specified in the instructions to the DMA engine. In one or more embodiments of the invention, the volatile storage device may write data to the shared memory partition of the volatile storage device indicating that the DMA instructions were successfully executed.

In Step 564, the DMA engine updates the data queue of the shared memory partition to indicate that the remapped data request was successfully completed. In one or more embodiments of the invention, upon receiving the status from the volatile storage device that the specified actions were successful (or identifying that the status has been written to the shared memory partition), the DMA engine updates the data queue to indicate that the remapped data request was completed.

In Step 566, the storage module driver detects that the data queue was updated to include an indication that the remapped data request was successfully executed. Then, in one or more embodiments of the invention, the storage module driver reports to the user space application that the data request was successfully completed.

Figure 6:
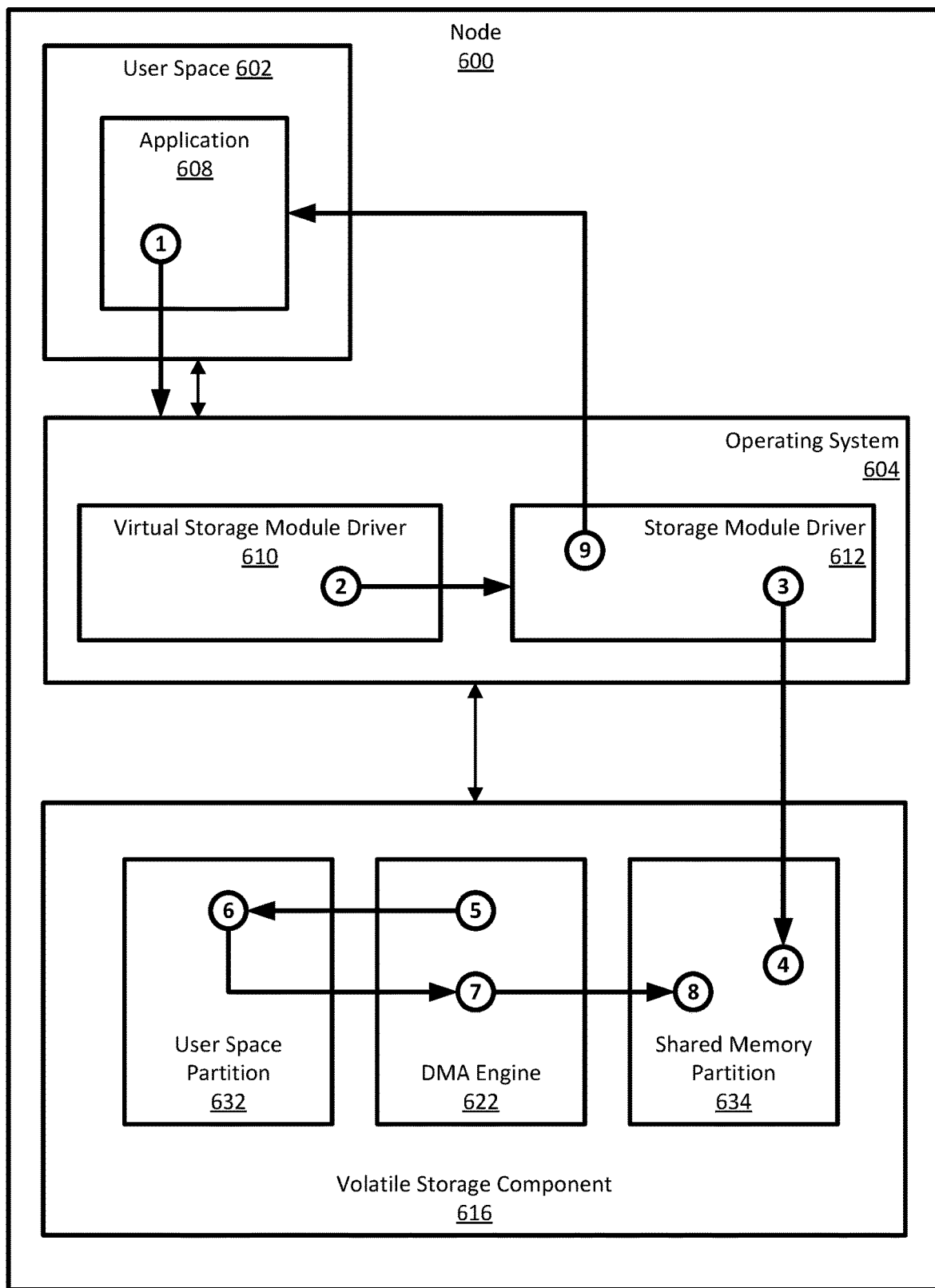
FIG. 6 shows an example of node handling a data request, in accordance with one or more embodiments of the invention.

FIG. 6 shows an example of node handling a data request, in accordance with one or more embodiments of the invention. The following use case is for explanatory purposes only and not intended to limit the scope to this embodiment. The example of FIG. 6 may generally follow the method of FIG. 5.

In FIG. 6, consider a scenario in which, at (1), an application (608) of user space (602) in node (600) sends a write data request to the operating system (604). that specifies a virtual user space partition (as created by the virtual storage module driver) and a file handle within that virtual user space partition. Additionally, the write data request specifies a modification to be made to the file associated with the file handle.

At (2), the virtual storage module driver (610) intercepts the write data request sent by the application and remaps (i.e., modifies) the write data request before forwarding the data request to the storage module driver. The virtual storage module driver (610) remaps the write data request using the user space partition offset associated with that virtual user space partition. In one or more embodiments of the invention, the virtual storage module driver (610) modifies the write data request such that the data request references (1) the user space partition and (2) the user space partition offset, and removes any reference to the virtual user space partition. After the write data request is remapped, the virtual storage module driver (610) forwards the remapped write data request to the storage module driver (612).

At (3), the storage module driver (612) receives the remapped write data request from the virtual storage module driver (610). In one or more embodiments of the invention, the storage module driver (612) analyzes the remapped write data request and determines that the remapped write data request properly specifies the user space partition and the user space partition offset. Accordingly, the storage module driver (612) forwards the remapped write data request to the data queue located in the shared memory partition (634) of the volatile storage component (616).

At (4), the DMA engine (622) of the volatile storage component (616) detects that the remapped write data request has been written to the data queue of the shared memory partition (634) of the volatile storage component (616). The DMA engine (622) processes the remapped write data request by generating and sending instructions to copy the new/modified data (specified in the original data request) to the location in the user space partition (632) of the volatile storage device specified in the remapped data request. After one or more instructions are generated to perform the actions of the remapped write data request, the DMA engine (622) executes these instructions using the volatile storage device of the volatile storage component (616).

At (5), the volatile storage device performs the actions specified in the instructions generated by the DMA engine (622) (generated from the remapped write data request). Here, the actions writing include new/modified data to a specified address. After performing the actions specified by the DMA engine (622), the volatile storage device writes a status to the shared memory partition of the volatile storage device indicating that the DMA instructions were successfully executed.

At (6), the DMA engine (622) receives the status from the volatile storage device that the specified actions were successful (or identifies that the status has been written to the shared memory partition (634)), then at (7), the DMA engine (622) updates the data queue of the shared memory partition (634) to indicate that the remapped data request was successfully completed.

At (8), the storage module driver (612) detects that the data queue was updated to include an indication that the remapped write data request was successfully executed. Then, the storage module driver (612) reports to the user space (602) application (608) that the write data request was successfully completed.

Figure 7:
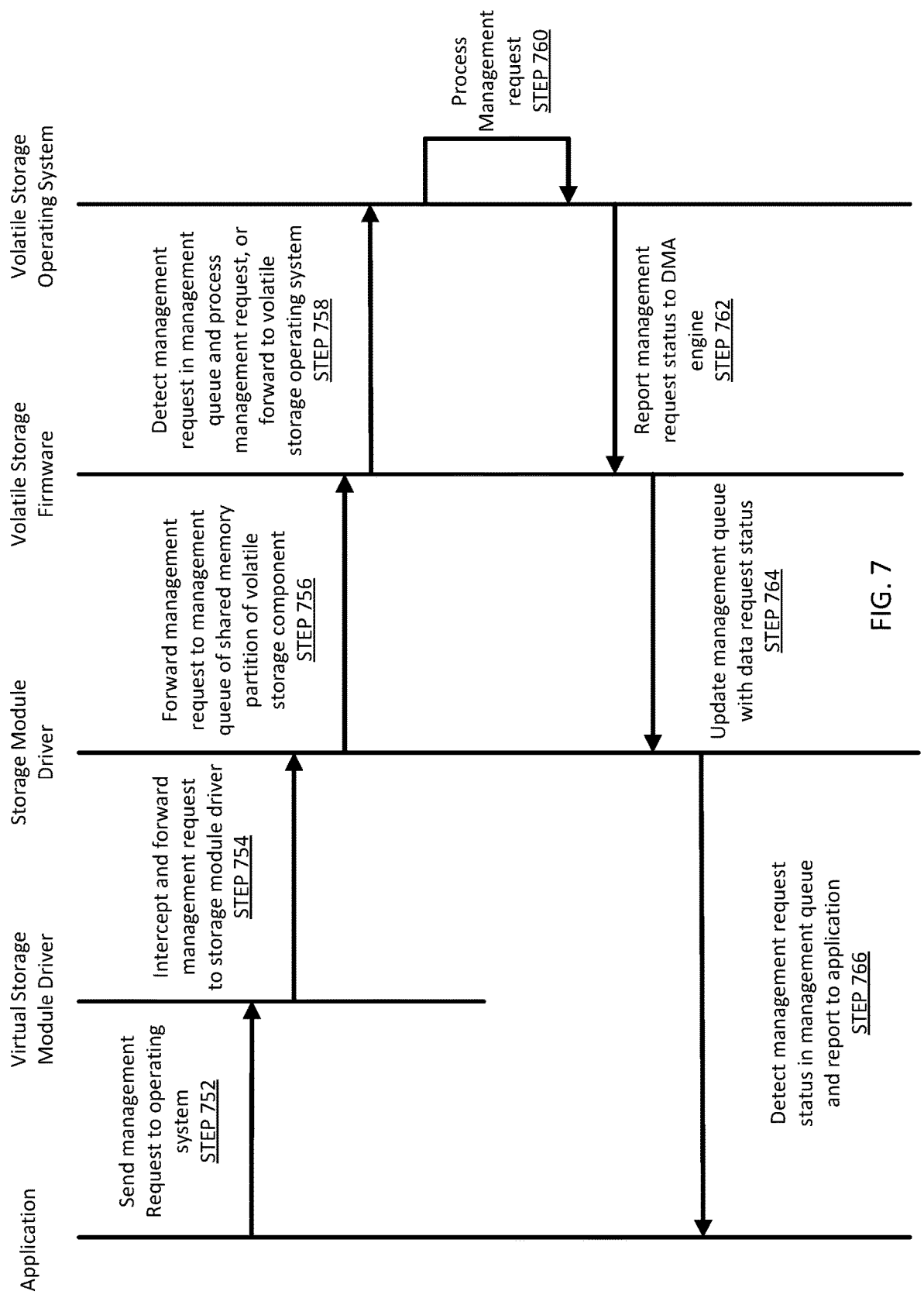
FIG. 7 shows a flowchart of a method of handling a management request, in accordance with one or more embodiments of the invention.

FIG. 7 shows a flowchart of a method of handling a management request, in accordance with one or more embodiments of the invention. All or a portion of the method shown in FIG. 7 may be performed by one or more components of the node. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 752, a user space application sends a management request to the operating system. The management request may specify one or more components of the volatile storage component and may include associated actions to be performed by those components. In one or more embodiments of the invention, the management request may be a request to query the health of the non-volatile storage device, a request to encrypt data on the volatile storage device and/or non-volatile storage device, a request to erase data on the volatile storage device and/or non-volatile storage device, and/or any action related to the components of the volatile storage component and non-volatile storage device.

In Step 754, the virtual storage module driver intercepts the management request sent by the application and forwards the data request to the storage module driver. In one or more embodiments of the invention, the virtual storage module driver may monitor and analyze all requests to and from an application as those requests traverse the operating system. Further, if a management request is sent to the operating system by an application, the virtual storage module driver may forward the management request to the storage module driver without any modification.

In Step 756, the storage module driver receives the management request from the virtual storage module driver. In one or more embodiments of the invention, the storage module driver analyzes the management request to identify the type of request (i.e., a management request). After analyzing the management request, the storage module driver forwards the management request to the volatile storage component. Specifically, in one or more embodiments of the invention, the storage module driver may be configured to forward the management request to a management queue located in the shared memory partition of the volatile storage component.

In Step 758, the volatile storage firmware of the volatile storage component detects that data (i.e., the management request) has been written to the management queue of the shared memory partition of the volatile storage component. In one or more embodiments of the invention, upon detection of the management request in the management queue, the volatile storage firmware processes the management request by generating and sending one or more instructions to the volatile storage operating system to complete the action(s) specified in the management request. For example, if the management request is a request to query the health of the non-volatile storage device, the volatile storage firmware generates instructions to query the non-volatile storage device. Similarly, if the management request is a request to encrypt data on the volatile storage device and/or non-volatile storage device, the volatile storage firmware generates instructions to encrypt the data persisted on those devices. In one or more embodiments of the invention, after one or more instructions are generated to perform the actions of the management request, the volatile storage firmware forwards these instructions to the volatile storage operating system to complete the specified actions.

In Step 760, the volatile storage operating system performs the actions specified in the instructions generated by the volatile storage firmware. Additional detail regarding the execution of a management request, by the volatile storage operating system, may be found in the description of FIG. 9.

In Step 762, the volatile storage operating system reports the status of the actions (e.g., those of the management request) to the volatile storage firmware provides any data, if applicable, to the shared memory partition. In one or more embodiments of the invention, the volatile storage operating system device may write data to the shared memory partition of the volatile storage device indicating that the management request was successfully executed.

In Step 764, the volatile storage firmware updates the management queue of the shared memory partition to indicate that the management request was successfully completed. In one or more embodiments of the invention, upon receiving the status from the volatile storage operating system that the specified actions were successful (or identifying that the status has been written to the shared memory partition), the volatile storage firmware updates the management queue to indicate that the management request was completed.

In Step 766, the storage module driver detects that the management queue was updated to include an indication that the management request was successfully executed. Then, in one or more embodiments of the invention, the storage module driver reports to the user space application that the management request was successfully completed.

Figure 8:
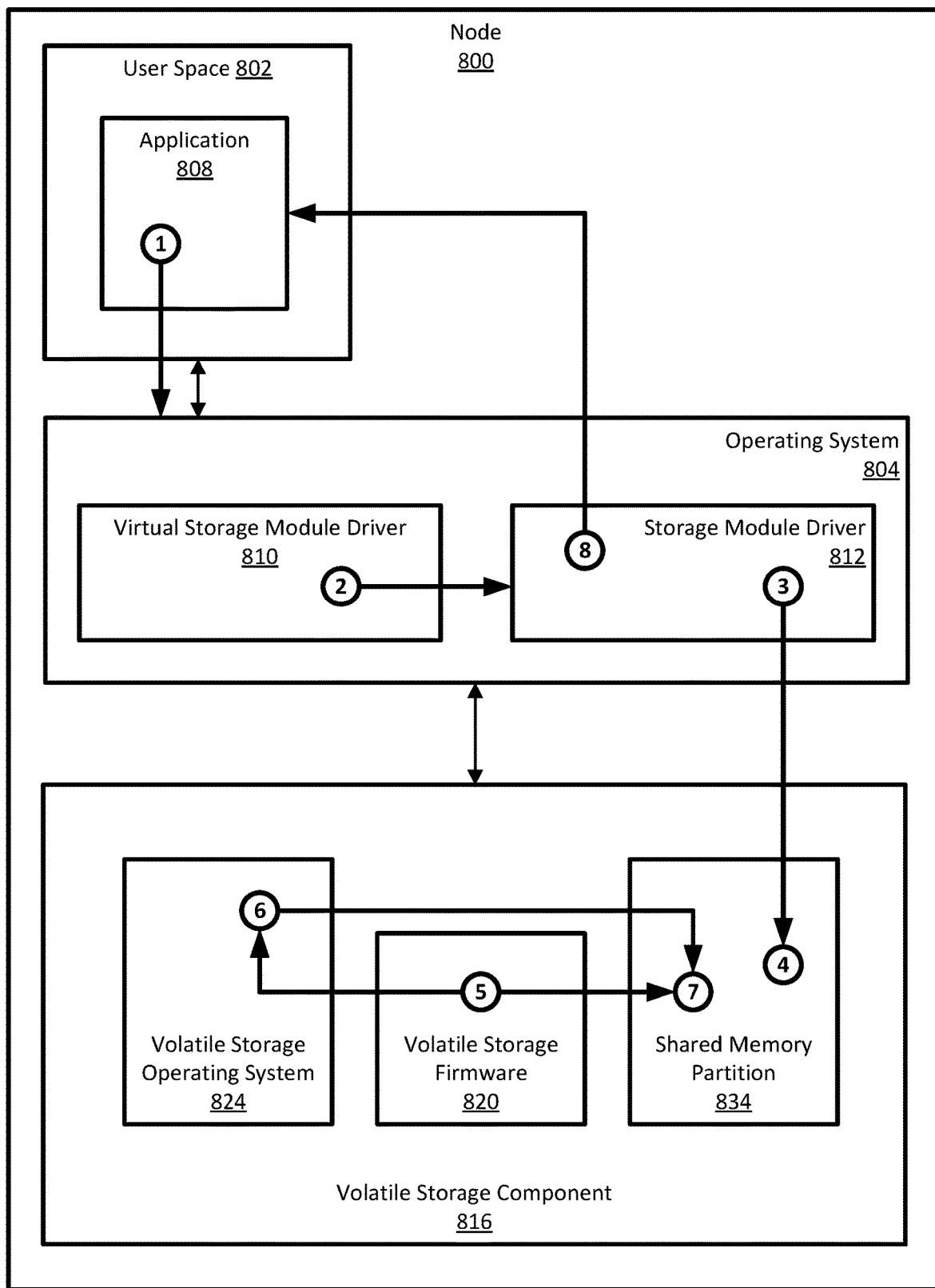
FIG. 8 shows an example of node handling a data request, in accordance with one or more embodiments of the invention.

FIG. 8 shows an example of node handling a data request, in accordance with one or more embodiments of the invention. The following use case is for explanatory purposes only and not intended to limit the scope to this embodiment. The example of FIG. 6 may generally follow the method of FIG. 7.

In FIG. 8, consider a scenario in which, at (1), an application (808) of user space (802) of node (800) sends a management request to the operating system (804). As an example, the management request is a request to query the health of the non-volatile storage device (not shown). At (2), the virtual storage module driver (810) intercepts the management request sent by the application (808) and forwards the data request to the storage module driver (812) without any modification. At (3), the storage module driver (812) receives the management request from the virtual storage module driver (810). The storage module driver (812) analyzes the management request to identify the type of request (i.e., a management request) and, at (4) forwards the management request to the management queue located in the shared memory partition (834) of the volatile storage component (816).

At (5), the volatile storage firmware (820) of the volatile storage component (816) detects that data (i.e., the management request) has been written to the management queue of the shared memory partition (834) of the volatile storage component (816). In one or more embodiments of the invention, upon detection of the management request in the management queue, the volatile storage firmware (820) processes the management request by generating and sending one or more instructions to the volatile storage operating system (824) to complete the action(s) specified in the management request. Specifically, in this example, the volatile storage firmware (820) generates instructions to query the non-volatile storage device (not shown) to determine a health status of the device. Once generated, the volatile storage firmware (820) forwards these instructions to the volatile storage operating system (824) to complete the specified actions.

At (6), the volatile storage operating system (824) receives and performs the instructions sent by the volatile storage firmware (820). Here, the volatile storage operating system (824) queries the non-volatile storage device (not shown) to receive health-related status data. Upon receipt of the health data, the volatile storage operating system (824) then writes the health data to the shared memory partition (834) of the volatile storage component (816) and further writes data indicating that the operation was successfully completed.

At (7), the volatile storage firmware (820) receives the status of the actions and the health data from the volatile storage operating system (824) and updates the management queue to indicate that the management query was successfully completed. The volatile storage firmware (820) further writes the health data to a location that may be retrieved by the storage module driver (812) (e.g., in the shared memory partition (834)).

At (8), the storage module driver (812) detects that the management queue was updated to include an indication that the management request was successfully executed. Then, in one or more embodiments of the invention, the storage module driver (812) reports to the user space (802) application (808) that the management request was successfully completed and provides the health data provided by the volatile storage firmware (820).

Figure 9:
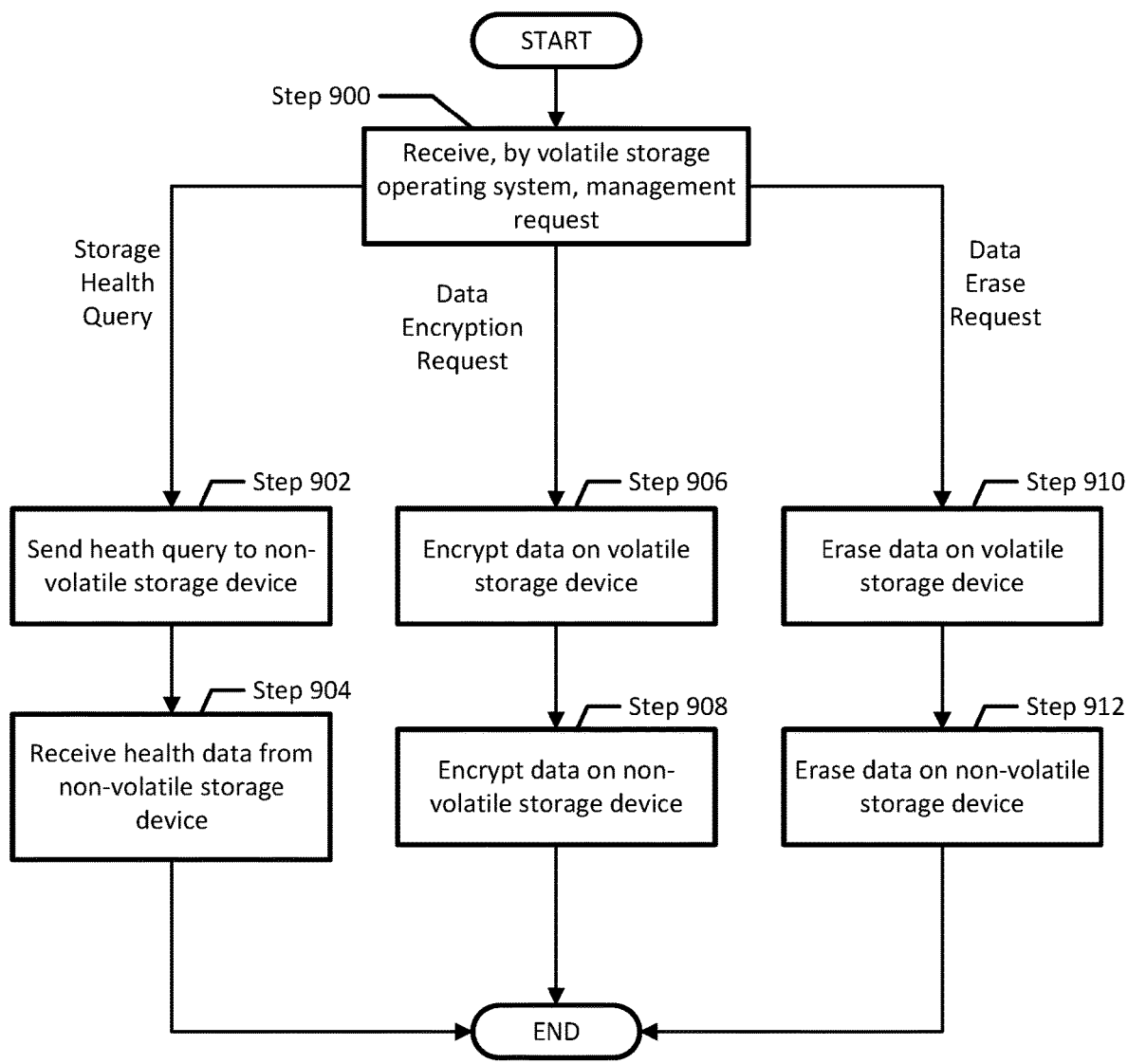
FIG. 9 shows a flowchart of a method of handling a management request by a volatile storage operating system, in accordance with one or more embodiments of the invention.

FIG. 9 shows a flowchart of a method of handling a management request by a volatile storage operating system, in accordance with one or more embodiments of the invention. All or a portion of the method shown in FIG. 9 may be performed by one or more components of the volatile storage component. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 900, a volatile storage operating system receives a management request from a volatile storage firmware. The management request may specify one of many potential operations to be performed by one or more components of the volatile storage component. Three examples are provided in FIG. 9, relating to process of a storage health query (Steps 902-904), a data encryption request (Steps 906-908), and a data erase request (Steps 910-912).

In Step 902, the volatile storage operating system sends the health query to the non-volatile storage device. In one or more embodiments of the invention, the health query may be for Self-Monitoring, Analysis, and Reporting Technology (SMART) data maintained by the non-volatile storage device.

In Step 904, the volatile storage operating system receives the health data from the non-volatile storage device. In one or more embodiments of the invention, the non-volatile storage device interacts with the volatile storage operating system as though the volatile storage component is the primary system in which the non-volatile storage device exists. Accordingly, in one embodiment of the invention, the volatile storage operating system is the only entity that can directly communicate with the non-volatile storage device to query for and receive such data.

In Step 906, the volatile storage operating system processes a request to encrypt the data on the volatile storage device by encrypting any data persisted thereon. In one or more embodiments of the invention, the volatile storage operating system may use any form of suitable encryption.

In Step 908, the volatile storage operating system processes a request to encrypt data on the non-volatile storage device by encrypting any data persisted thereon. The request of Step 908 may be the same request processed in Step 906 and received in Step 900, or the request may be entirely separate from the process of Step 906.

In Step 910, the volatile storage operating system processes a request to erase the data on the volatile storage device by erasing any data persisted thereon. In one or more embodiments of the invention, the volatile storage operating system may disconnect power to the volatile storage device (thereby erasing the data), send a command to overwriting existing data when new data arrives, or may proactively overwrite existing data with empty new data (e.g., all "0"s).

In Step 912, the volatile storage operating system processes a request to erase the data on the non-volatile storage device by erasing any data persisted thereon. In one or more embodiments of the invention, the volatile storage operating system may end a command to overwriting existing data when new data arrives, or may proactively overwrite existing data with empty new data (e.g., all "0"s).

Figure 10:
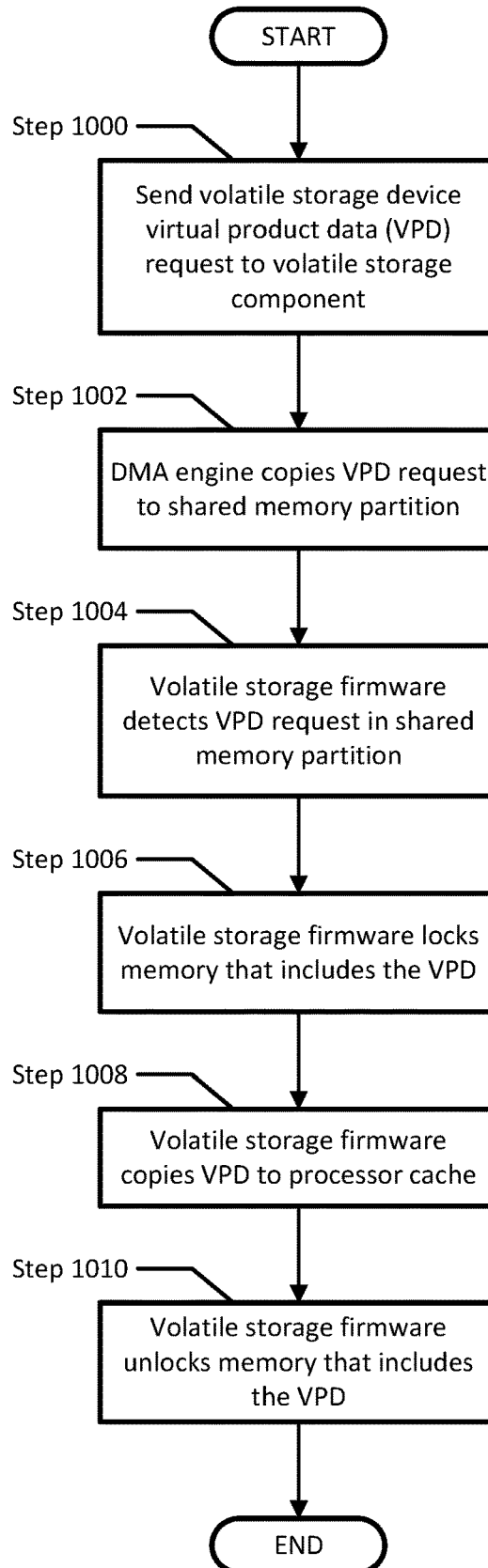
FIG. 10 shows a flowchart of a method of retrieving virtual product data, in accordance with one or more embodiments of the invention.

FIG. 10 shows a flowchart of a method of retrieving virtual product data, in accordance with one or more embodiments of the invention. All or a portion of the method shown in FIG. 10 may be performed by one or more components of the node. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1000, an entity sends a volatile storage device virtual product data (VPD) request to the volatile storage component. In one or more embodiments of the invention, the entity may be any program, application, or device that may query such information (e.g., the storage module driver, a user space application, another node, etc.).

In Step 1002, upon receipt of the volatile storage device VPD request, the DMA engine of the volatile storage component copies the request to the shared memory partition of the of the volatile storage device. In one or more embodiments of the invention, the DMA engine may copy the request to a specific region of the shared memory partition such that another software entity may identify the request and perform additional actions based on the presence of the data.

In Step 1004, the volatile storage firmware detects the volatile storage device VPD request in the shared memory partition of the volatile storage device. In one or more embodiments of the invention, the volatile storage firmware identifies the location of the volatile storage device VPD on the volatile storage device (e.g., in an electrically erasable programmable read-only memory (EEPROM)).

In Step 1006, the volatile storage firmware locks the memory location that includes the volatile storage device VPD. In one or more embodiments of the invention, the volatile storage firmware locks the memory location storing the volatile storage device VPD to prevent any changes to the memory while the volatile storage firmware is copying the data.

In Step 1008, the volatile storage firmware copies the volatile storage device VPD to the processor cache of the volatile storage component. In one or more embodiments of the invention, the volatile storage firmware may copy the data to the processor cache of the volatile storage component such that any future requests for the volatile storage device VPD may be answered by reading the data from the processor cache of the volatile storage component (instead of the memory location that includes the volatile storage device VPD).

In Step 1010, the volatile storage firmware unlocks the memory location that includes the volatile storage device VPD. In one or more embodiments of the invention, the volatile storage firmware unlocks the memory location storing the volatile storage device VPD as the volatile storage firmware has completed performing copying the data, and changes may now be made the VPD.

Figure 11:
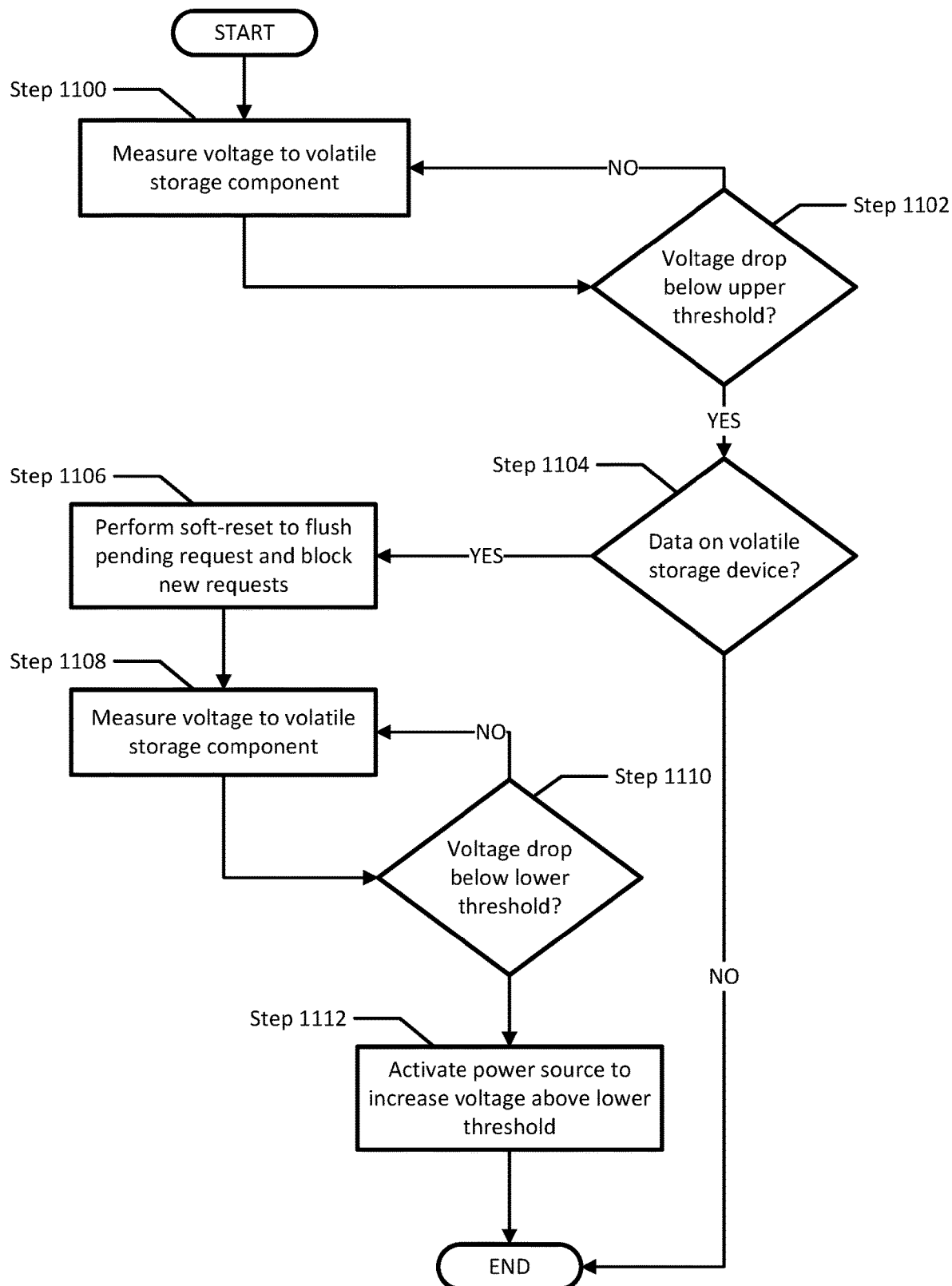
FIG. 11 shows a flowchart of a method of handling a voltage drop in a volatile storage component, in accordance with one or more embodiments of the invention.

FIG. 11 shows a flowchart of a method of handling a voltage drop in a volatile storage component, in accordance with one or more embodiments of the invention. All or a portion of the method shown in FIG. 11 may be performed by one or more components of the volatile storage component. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1100, the volatile storage firmware monitors the voltage supplied to the volatile storage component. In one or more embodiments, the volatile storage firmware will continually receive voltage data from a power management device that coordinates the receipt of electrical power from the node.

In Step 1102, the volatile storage firmware makes a determination as to whether the voltage supplied to the volatile storage component has dropped below an upper threshold. If the voltage supplied to the volatile storage component drops below an upper threshold (1102—YES), the process proceeds to Step 1104. However, if the voltage supplied to the volatile storage component remains above the upper threshold (1102—NO), the process reverts back to Step 1100 and the volatile storage firmware continues to monitor the supplied voltage.

In Step 1104, the volatile storage firmware makes a determination as to whether data is persisted on the volatile storage device of the volatile storage component. If the volatile storage firmware determines that data is persisted on the volatile storage device (1104—YES), the process proceeds to Step 1106. However, if the volatile storage firmware determines that no data is persisted on the volatile storage device (1104—NO), the process may end.

In Step 1106, the volatile storage firmware performs a soft-reset of the volatile storage component. In one or more embodiments of the invention, the soft-reset will flush (e.g., erase) any data requests and/or management requests that were pending and/or being performed. Further, the soft-reset may block the receipt of new data requests and/or management requests thereby preventing new requests from being processed.

In Step 1108, like Step 1100, the volatile storage firmware monitors the voltage supplied to the volatile storage component. In one or more embodiments, the volatile storage firmware continually receives voltage data from a power management device that coordinates the receipt of electrical power from the node.

In Step 1110, similar Step 1102, the volatile storage firmware makes a determination as to whether the voltage supplied to the volatile storage component has dropped below a lower threshold. If the voltage supplied to the volatile storage component drops below the lower threshold (1110—YES), the process proceeds to Step 1112. However, if the voltage supplied to the volatile storage component remains above the lower threshold (1110—NO), the process reverts back to Step 1108 and the volatile storage firmware continues to monitor the supplied voltage.

Further, in one or more embodiments of the invention, the voltage may increase above the upper threshold maintain sufficient voltage for a period of time. The volatile storage component may be configured, in such a scenario, to undo the processes of Steps 1106 and revert back to Step 1100.

In Step 1112, upon detection that the voltage supplied to the volatile storage component dropped below the lower threshold, the volatile storage firmware will activate the power source of the volatile storage component. In one or more embodiments of the invention, by activating (e.g., turning on, switching to) the power source within the volatile storage component, the voltage supplied to the volatile storage component will be increased to a sufficient level to allow for the components of the volatile storage component to properly function and perform any further required processes.

Figure 12A:
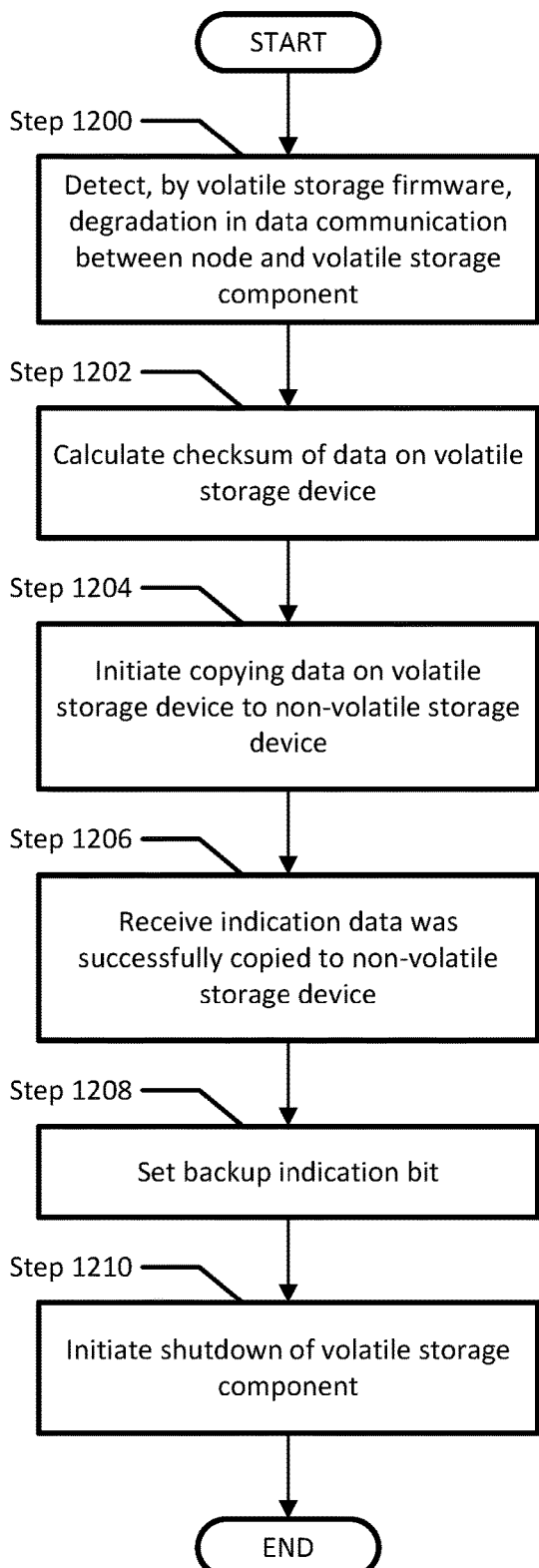
FIG. 12A shows a flowchart of a method of handling a degradation in data communications with a volatile storage component, in accordance with one or more embodiments of the invention.

FIG. 12A shows a flowchart of a method of handling a degradation in data communications with a volatile storage component, in accordance with one or more embodiments of the invention. All or a portion of the method shown in FIG. 12A may be performed by one or more components of the volatile storage firmware. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel. In one or more embodiments of the invention, the process of FIG. 12A may be performed after the process of FIG. 11 has occurred. Accordingly, the process of FIG. 12A may occur while the volatile storage component is powered by the internal power source of the volatile storage component (and not provided external power from the node).

In Step 1200, the volatile storage firmware of the volatile storage component detects a degradation in the communications between the node and volatile storage component. In one or more embodiments of the invention, the data communication between the node and volatile storage component may provide warning of an impending power failure before a voltage drop is detected and/or processed. In one or more embodiments of the invention, the volatile storage firmware may detect degradation of data communications by (i) detecting an increase in impedance of one or more electrical contacts between the node and the volatile storage component (e.g., surpassing a threshold of 200 kΩ), (ii) receiving data with uncorrectable errors, (iii) identifying gaps in communication transmissions, and/or (iv) receipt of erroneous transmissions. The data communications between the node and volatile storage component may be via one or more common interfaces and protocols (e.g., peripheral component interconnect (PCI), PCI express (PCIe), M.2, serial advanced technology attachment (SATA), etc.).

In Step 1202, the volatile storage firmware calculates a checksum of the data persisted on the volatile storage device. In one or more embodiments of the invention, the checksum is calculated to provide a method for ensuring data integrity at a future point. That is, in one or more embodiments of the invention, it is assumed that the calculated checksum will be unique to the data as it exists on the volatile storage device at that moment. Accordingly, a copy of the data may be verified to be accurate by comparing the checksum of the copy of the data against the calculated checksum of the original data. If the two checksums are the same, the data can be assumed to have remained unchanged, unaltered, and uncorrupted.

In Step 1204, the volatile storage firmware initiates copying of the data on the volatile storage device to the non-volatile storage device. In one or more embodiments of the invention, the volatile storage firmware initiates the copying of the data by instructing the DMA engine to copy the data from the volatile storage device to the non-volatile storage device. Further, as the volatile storage firmware and the DMA engine are independently executing on separate processor cores, the copying of the data (by the DMA engine) may be performed concurrently with the process of calculating a checksum (in Step 1202, by the volatile storage firmware).

In Step 1206, the volatile storage firmware receives indication (from the DMA engine) that the data located on the volatile storage device was successfully copied to the non-volatile storage device. In one or more embodiments of the invention, the DMA engine reports to the volatile storage firmware upon successfully copying all data to the non-volatile storage device.

In Step 1208, the volatile storage firmware sets a backup indication bit that indicates that data was copied due to degradation in data communications. The backup indication bit is set in any suitable non-volatile storage device location which may be read at a future time.

In Step 1210, the volatile storage firmware initiates a shutdown if the volatile storage component. In one or more embodiments of the invention, shutting down the volatile storage component may include instructing each software instance to prepare for power loss and turning off the power source within the volatile storage component.

Figure 12B:
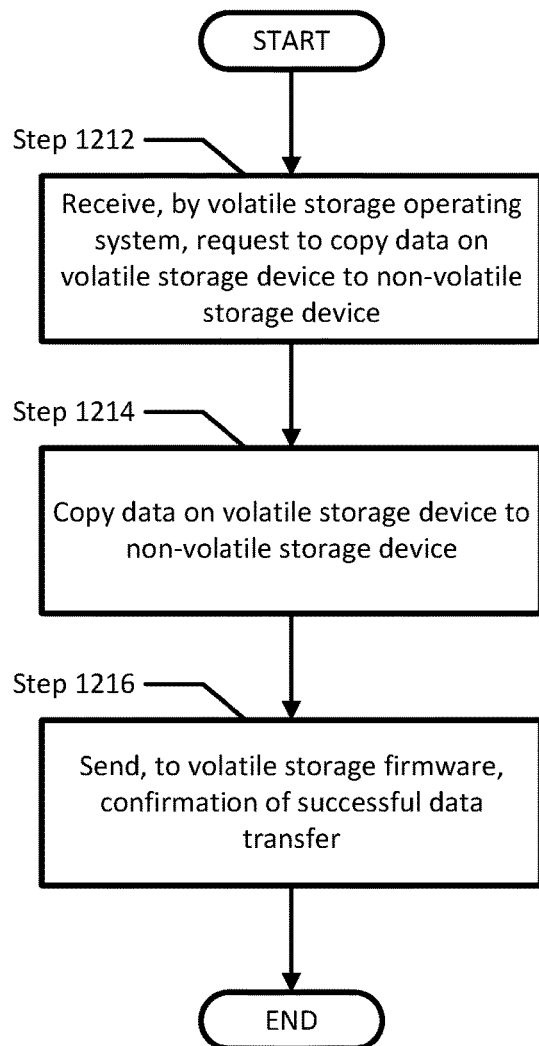
FIG. 12B shows a flowchart of backing up data, in accordance with one or more embodiments of the invention.

FIG. 12B shows a flowchart of backing up data, in accordance with one or more embodiments of the invention. All or a portion of the method shown in FIG. 12B may be performed by one or more components of the volatile storage component, specifically DMA engine or other software. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 1212, the DMA engine of the volatile storage component receives instructions to copy data from the volatile storage device to the non-volatile storage device. In one or more embodiments of the invention, the DMA agent immediately begin performing the instructions upon receipt from the volatile storage firmware.

In Step 1214, the DMA copies the data from the volatile storage device to the non-volatile storage device. The copying may be performed via one or more protocols optimized to copy data from one memory device to another memory device, thereby reducing the time required perform the operations.

In Step 1216, the DMA engine sends confirmation to the volatile storage firmware that the data persisting on the volatile storage device was successfully copied to the non-volatile storage device.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for processing requests, comprising:
    receiving, by a volatile storage component, a request from a user space application, wherein the request is a management request, and wherein the management request is an erase request to erase all data on the volatile storage component;
    writing the request into a shared memory partition;
    generating instructions associated with the request, wherein generating the instructions associated with the request comprises:
    detecting, by the volatile storage component, the management request in the shared memory partition, wherein the management request is written in a management queue; and
    processing the instructions.

2. The method of claim 1, wherein the request is a data request and wherein generating the instructions associated with the request comprises:
    detecting, by the volatile storage component, the data request in the shared memory partition, wherein the data request is written in a data queue.

3. The method of claim 1, wherein the management request is a storage health query for a non-volatile storage device operatively connected to the volatile storage component.

4. The method of claim 3, wherein in response to processing the instructions:
    the volatile storage component receives health data from the non-volatile storage device.

5. The method of claim 1, wherein the management request further specifies erasing all data on a non-volatile storage device operatively connected to the volatile storage component.

6. A non-transitory computer readable medium comprising computer code which, when executed by a computer processor, enables the computer processor to perform a method for processing requests, comprising:
    receiving, by a volatile storage component, a request from a user space application, wherein the request is a management request, and wherein the management request is an erase request to erase all data on the volatile storage component;
    writing the request into a shared memory partition;
    generating instructions associated with the request, wherein generating the instructions associated with the request comprises:
    detecting, by the volatile storage component, the management request in the shared memory partition, wherein the management request is written in a management queue; and
    processing the instructions.

7. The non-transitory computer readable medium of claim 6, wherein the request is a data request and wherein generating the instructions associated with the request comprises:
    detecting, by the volatile storage component, the data request in the shared memory partition, wherein the data request is written in a data queue.

8. The non-transitory computer readable medium of claim 6, wherein the management request is a storage health query for a non-volatile storage device operatively connected to the volatile storage component.

9. The non-transitory computer readable medium of claim 8, wherein in response to processing the instructions:
    the volatile storage component receives health data from the non-volatile storage device.

10. The non-transitory computer readable medium of claim 6, wherein the management request further specifies erasing all data on a non-volatile storage device operatively connected to the volatile storage component.

11. A volatile storage component, comprising:
    volatile storage device;
    shared memory partition; and
    a processor, wherein the processor is configured to perform a method for processing requests, comprising:
    receiving a request from a user space application, wherein the request is a management request, and wherein the management request is an erase request to erase all data on the volatile storage component;
    writing the request into the shared memory partition;
    generating instructions associated with the request, wherein generating the instructions associated with the request comprises:
    detecting, by the volatile storage component, the management request in the shared memory partition, wherein the management request is written in a management queue; and
    processing the instructions.

12. The volatile storage component of claim 11, wherein the request is a data request and wherein generating the instructions associated with the request comprises:
    detecting the data request in the shared memory partition, wherein the data request is written in a data queue.

13. The volatile storage component of claim 11, wherein the management request is a storage health query for a non-volatile storage device operatively connected to the volatile storage component.

14. The volatile storage component of claim 13, wherein in response to processing the instructions: the volatile storage component receives health data from the non-volatile storage device.

* * * * *